(12) United States Patent
Azuma et al.

(10) Patent No.: US 8,068,193 B2
(45) Date of Patent: Nov. 29, 2011

(54) LIQUID CRYSTAL DISPLAY DEVICE

(75) Inventors: Yuji Azuma, Fujisawa (JP); Masaki Tsubokura, Mobara (JP); Shimon Itakura, Mobara (JP); Shiro Ueda, Chiba (JP)

(73) Assignees: Panasonic Liquid Crystal Display Co., Ltd., Hyogo (JP); Hitachi Displays, Ltd., Chiba (JP)

( * ) Notice: Subject to any disclaimer, the term of this patent is extended or adjusted under 35 U.S.C. 154(b) by 298 days.

(21) Appl. No.: 12/034,709

(22) Filed: Feb. 21, 2008

(65) Prior Publication Data

US 2008/0204628 A1   Aug. 28, 2008

(30) Foreign Application Priority Data

Feb. 22, 2007 (JP) ................. 2007-041609

(51) Int. Cl.
*G02F 1/1335* (2006.01)
(52) U.S. Cl. ........................... 349/61; 349/68
(58) Field of Classification Search .............. 349/48, 349/61, 68
See application file for complete search history.

(56) References Cited

U.S. PATENT DOCUMENTS

| 7,264,373 B2 * | 9/2007 | Huang et al. | 362/219 |
| 7,585,100 B2 * | 9/2009 | Aoki et al. | 362/634 |
| 2004/0156183 A1 | 8/2004 | Kim | |
| 2005/0226002 A1 * | 10/2005 | Aoki et al. | 362/581 |
| 2006/0120061 A1 * | 6/2006 | Jang et al. | 362/27 |
| 2006/0133108 A1 * | 6/2006 | Choi et al. | 362/613 |
| 2006/0187375 A1 * | 8/2006 | Kim | 349/60 |
| 2006/0284536 A1 * | 12/2006 | Misono et al. | 313/234 |

FOREIGN PATENT DOCUMENTS

JP   2005-347259   * 12/2005

* cited by examiner

*Primary Examiner* — K. Cyrus Kianni
(74) *Attorney, Agent, or Firm* — Antonelli, Terry, Stout & Kraus, LLP.

(57) ABSTRACT

An object of the present invention is to provide a liquid crystal display device including a back light in which an electrode support member can be reliably arranged on the base side without concern for thermal expansion. There is provided a liquid crystal display device comprising: a liquid crystal display panel; and a back light arranged on the back surface of the present liquid crystal display panel; wherein the back light is composed of a plurality of bar light sources arranged in parallel in a plane opposing the liquid crystal display panel and a base that supports each of the bar light sources through electrode fittings at electrode sections; wherein the electrode fittings are provided on electrode support members extending in a direction in which the bar light sources are arranged in parallel, in units of the electrode fittings that support a mating electrode section of each bar light source; and wherein the electrode support member includes a portion fixed to the base side at least one point and a portion covered by a projecting portion fixed to the base side at another point, along the extending direction of the electrode support member.

18 Claims, 8 Drawing Sheets

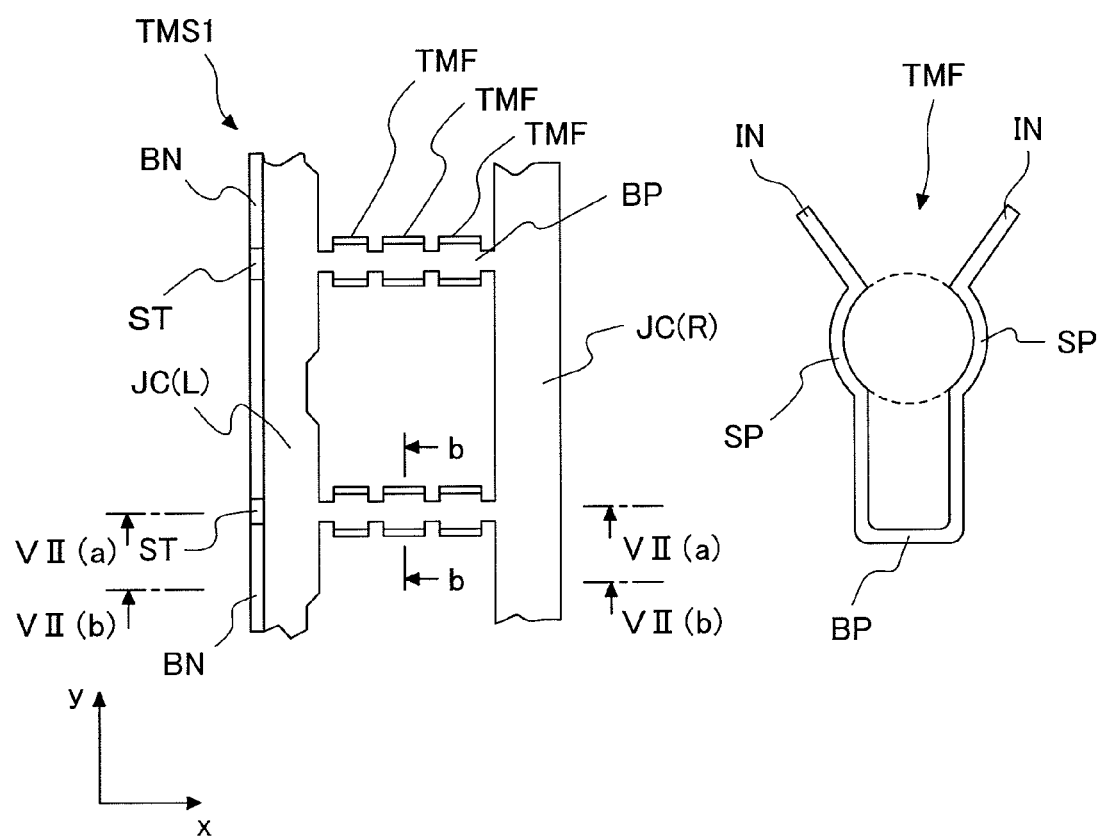

LIQUID CRYSTAL DISPLAY DEVICE

CLAIM OF PRIORITY

The present application claims priority from Japanese Application JP 2007-041609 filed on Feb. 22, 2007, the content of which is hereby incorporated by reference into this application.

BACKGROUND OF THE INVENTION

1. Field of the Invention

The present invention relates to a liquid crystal display device and particularly to a liquid crystal display device including a so-called direct-type back light.

2. Description of the Related Art

With the increase in size of the liquid crystal display panel, the use of the direct-type liquid crystal display device is also increasing because this type enables the homogenization of a planar light source as a back light.

With such a back light, a plurality of fluorescence tubes are arranged in parallel in a direction perpendicular to the longitudinal direction thereof in a plane opposing the liquid crystal display panel with a base having an optical reflective function. Each of these fluorescence tubes is sandwiched by electrode fittings at electrode sections at both ends thereof, the electrode fittings being arranged at both ends of the base.

A plurality of electrode fittings are formed on an electrode support member made of a band-shaped conductive material extending in a direction in which the fluorescence tubes are arranged in parallel. That is, the electrode support member has a function to sandwich a plurality of fluorescence tubes.

Therefore, the plurality of fluorescence tubes in the back light are connected in parallel by means of electrode support members and electrode fittings provided at both ends of the base.

A liquid crystal display device including such a back light is disclosed, for example, in JP-A-2005-347259.

SUMMARY OF THE INVENTION

However, with the thus-configured liquid crystal display device, the electrode support member is composed of a comparatively long band-shaped conductive material; accordingly, the degree of expansion by the heat from the fluorescence tubes increases. Also, it was confirmed that, if the electrode support member is fixed to the base side at several points, parts of the electrode support member between these fixing points are detached from the surface of the base side resulting in bending.

An object of the present invention is to provide a liquid crystal display device including a back light in which electrode support members can be reliably arranged on the base side without concern for thermal expansion.

Of the pieces of the invention disclosed in the present application, outlines of representative ones will be briefly explained below.

(1) A liquid crystal display device according to the present invention comprises, for example, a liquid crystal display panel and a back light arranged on the back surface of the liquid crystal display panel.

The back light is composed of a plurality of bar light sources arranged in parallel in a plane opposing the liquid crystal display panel and a base that supports each of the bar light sources through electrode fittings at electrode sections.

The electrode fittings are provided on an electrode support member extending in a direction in which the bar light sources are arranged in parallel, in units of the electrode fittings that support a mating electrode section of each bar light source.

The electrode support member includes a portion fixed to the base side at least one point and a portion covered by a projecting portion fixed to the base side at another point, along the extending direction of the electrode support member.

(2) The liquid crystal display device according to the present invention is premised, for example, on the configuration of (1), wherein the electrode support member includes a portion fixed to the base side on one end side in the extending direction thereof.

(3) The liquid crystal display device according to the present invention is premised, for example, on the configuration of (1), wherein the electrode support member is intermittently provided with a plurality of portions covered by the projecting portion along the extending direction the electrode support member.

(4) The liquid crystal display device according to the present invention is premised, for example, on the configuration of (1), wherein the projecting portion forms a portion which projects from a side wall surface of a member fixed to the base to cover the electrode support member, the side wall surface being formed almost perpendicularly to the base.

(5) The liquid crystal display device according to the present invention is premised, for example, on the configuration of (1), wherein the projecting portion is formed on a mounting surface of the electrode support member to provide a portion having a bent section so as to cover the electrode support member.

(6) The liquid crystal display device according to the present invention comprises, for example, a liquid crystal display panel and a back light arranged on the back surface of the liquid crystal display panel.

The back light is composed of a plurality of bar light sources arranged in parallel in a plane opposing the liquid crystal display panel and a base that supports each of the bar light sources through electrode fittings at electrode sections.

The electrode fittings are provided on an electrode support member extending in a direction in which the bar light sources are arranged in parallel, in units of the electrode fittings that support a mating electrode section of each bar light source.

The electrode support member is provided with a bent edge formed by bending along the extending direction thereof at least one edge thereof out of the edges which are in parallel with the extending direction thereof.

The electrode support member includes a portion fixed to the base side at least one point and a portion covered by a projecting portion fixed to the base side at another point, along the extending direction of the electrode support member.

(7) The liquid crystal display device according to the present invention is premised, for example, on the configuration of (6), wherein the portion covered by the projecting portion of the electrode support member includes a portion at which the bent edge is formed.

(8) The liquid crystal display device according to the present invention is premised, for example, on the configuration of (6), wherein the electrode support member includes a portion fixed to the base side on one end side in the extending direction of the electrode support member.

(9) The liquid crystal display device according to the present invention is premised, for example, on the configuration of (6), wherein the electrode support member is intermittently provided with a plurality of portions covered by the projecting portion along the extending direction of the electrode support member.

(10) The liquid crystal display device according to the present invention is premised, for example, on the configuration of (6), wherein the projecting portion forms a portion which projects from a side wall surface of a member fixed to the base to cover the electrode support member, the side wall surface being formed almost perpendicularly to the base.

(11) The liquid crystal display device according to the present invention is premised, for example, on the configuration of (6), wherein the projecting portion is formed on a mounting surface of the electrode support member to provide a portion having a bent section so as to cover the electrode support member.

The present invention is not limited to the above-mentioned configurations but can be modified in diverse ways without departing from the spirit and scope thereof.

In accordance with the thus-formed liquid crystal display device, it is possible to provide a back light by which an electrode support member can be reliably arranged on the base side without concern for thermal expansion.

BRIEF DESCRIPTION OF THE DRAWINGS

FIGS. 6A and 6B are enlarged views of a part of the electrode support member.

DETAILED DESCRIPTION OF THE PREFERRED EMBODIMENTS

Embodiments of a liquid crystal display device according to the present invention will be explained below with reference to the accompanying drawings.

Figure 2:
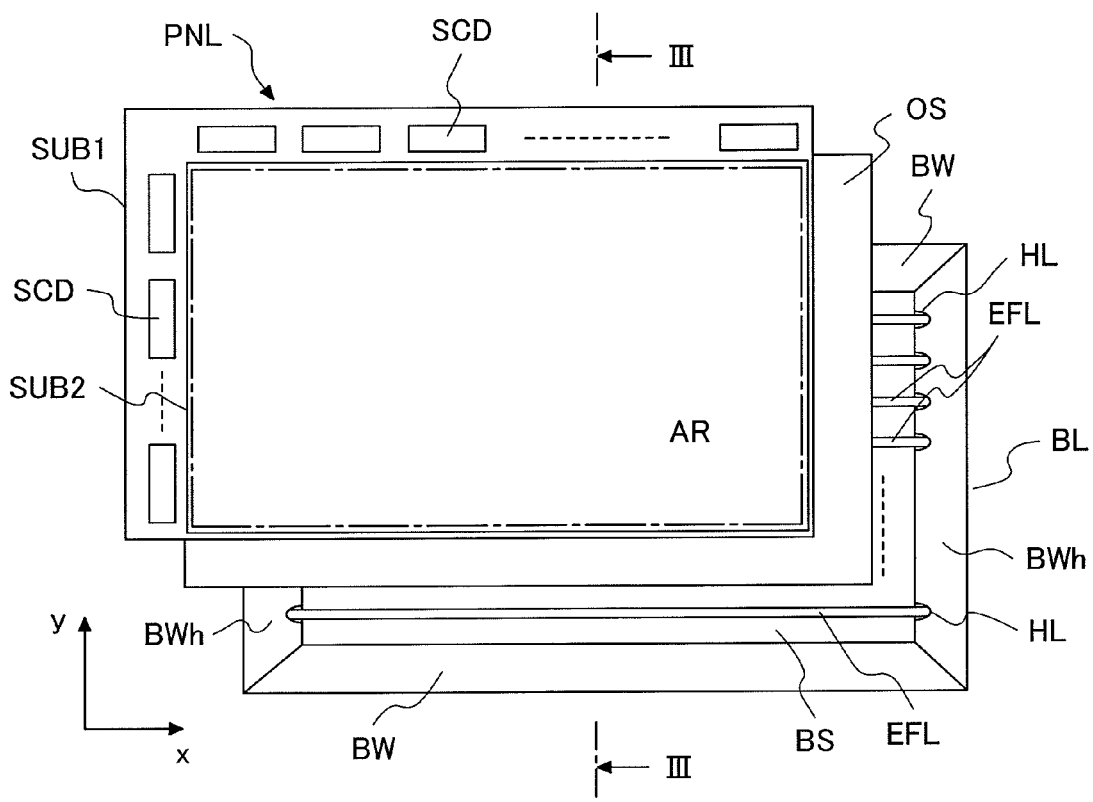
FIG. 2 is a schematic configuration diagram of the embodiment of the liquid crystal display device according to the present invention.

FIG. 2 is a schematic configuration diagram of an embodiment of the liquid crystal display device according to the present invention.

A liquid crystal display panel PNL, an optical sheet OS, and a back light BL are arranged in this order from the observer side.

The liquid crystal display panel PNL is composed of a package of a pair of substrates SUB1 and SUB2 which are for example made of glass and arranged in parallel, and liquid crystal is disposed between the substrates SUB1 and SUB2.

Pixels (not shown) arranged in matrix form are formed on the liquid-crystal-side surfaces of the substrates SUB1 and SUB2 with the liquid crystal included as one of their components so as to control the light transmission of the liquid crystal at each pixel.

An area in which these pixels are formed is referred to as liquid crystal display area AR (area surrounded by dashed lines in FIG. 2). The entire area of the liquid crystal display area AR is irradiated with the light emitted from the back light (to be mentioned later). The observer recognizes an image through the light that penetrates each pixel.

The substrate SUB1 arranged rearward with respect to the observer is made larger than the substrate SUB2 in area. Semiconductor devices SCD each composed of a circuit for independently driving each pixel are provided on the periphery of the substrate SUB1 exposed from the substrate SUB2.

On the back surface of the liquid crystal display panel PNL, a back light BL is arranged through, for example, a diffusion sheet, a prism sheet, or an optical sheet OS with a laminated structure of these sheets. The optical sheet OS is designed to diffuse or condense the light from the back light BL to lead it to the side of the liquid crystal display panel PNL.

The back light BL, a so-called direct-type back light, comprises a bottom frame (shown as BS in FIGS. 3 and 4) in a plane in parallel with the liquid crystal display panel PNL. The bottom frame is composed of a base that supports, for example, a plurality of external electrode fluorescence tubes EFL arranged in parallel in the y direction of FIG. 2, with their longitudinal directions matched to the x direction of FIG. 2. The bottom frame BS is composed, for example, of a box-shaped metal. A reflecting sheet RS having side wall surfaces BW is provided on the surface of the bottom frame BS, the side wall surfaces BW being obliquely arranged by bending each of the x-direction edges. Further, the bottom frame BS is provided with side wall plates BWh made, for example, of a resin material and having an optical reflective function in a plane on the side of the liquid crystal display panel PNL, the side wall plates BWh being obliquely arranged at each edge in the y direction of FIG. 2. The side wall plates BWh, together with the side wall surfaces BW of the reflecting sheet RS, substantially form the side walls of the back light BL. The configuration of the back light BL will be mentioned later in more detail.

Figure 3:
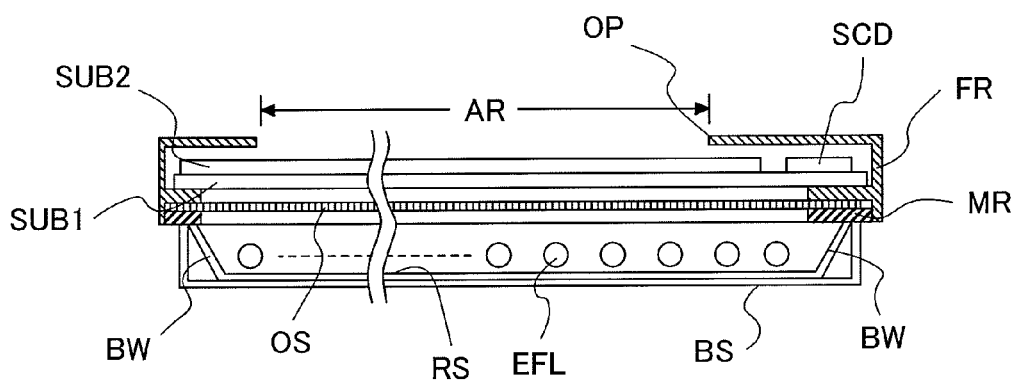
FIG. 3 is a cross-sectional view taken along the III-III line of FIG. 2.

Further, the liquid crystal display panel PNL, the optical sheet OS, and the back light BL are stored in a top frame FR and an intermediate frame MR, as shown in FIG. 3, so as to be formed as a modular liquid crystal display device. FIG. 3 is a cross-sectional view of the modular liquid crystal display device, which is equivalent to a cross section taken along the III-III line of FIG. 2. The top frame FR is provided with an opening OP for exposing the liquid crystal display area AR of the liquid crystal display panel PNL on the observer side and stores the liquid crystal display panel PNL, the optical sheet OS, and the back light BL which are positioned with sufficient accuracy. Although the semiconductor devices SCD are formed on the substrate SUB1 with the present embodiment, they may be formed on a flexible substrate. In that case, it is possible to fold the semiconductor devices SCD in the vertical direction of FIG. 3, allowing the size reduction of the frame.

Figure 4A:
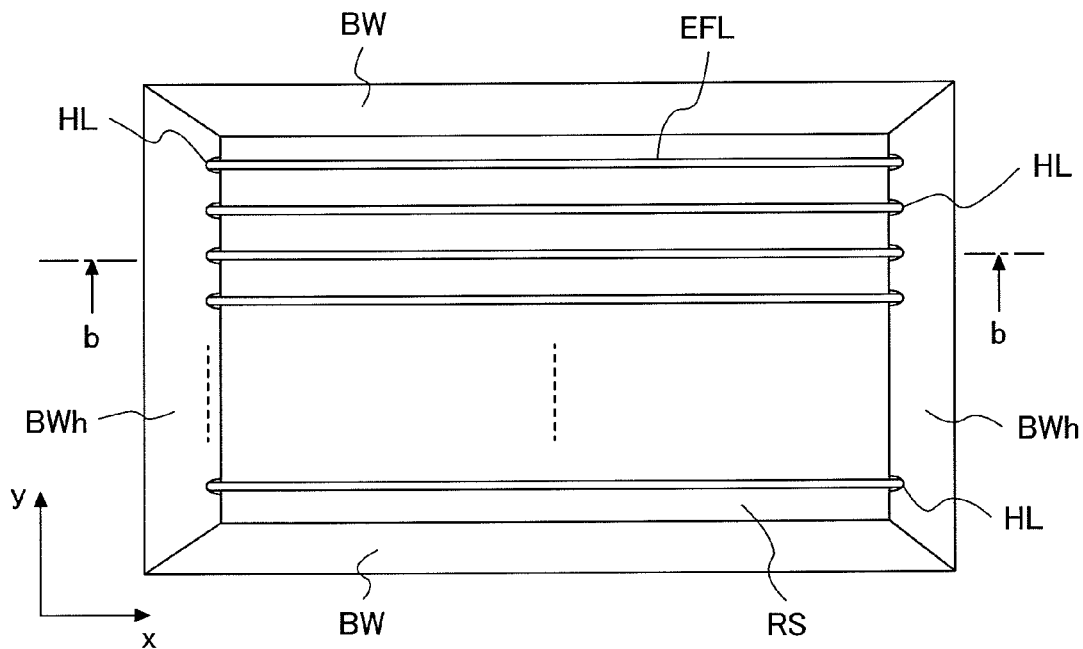
FIGS. 4A and 4B are configuration diagrams of an embodiment of a back light provided in the liquid crystal display device according to the present invention.
Figure 4B:
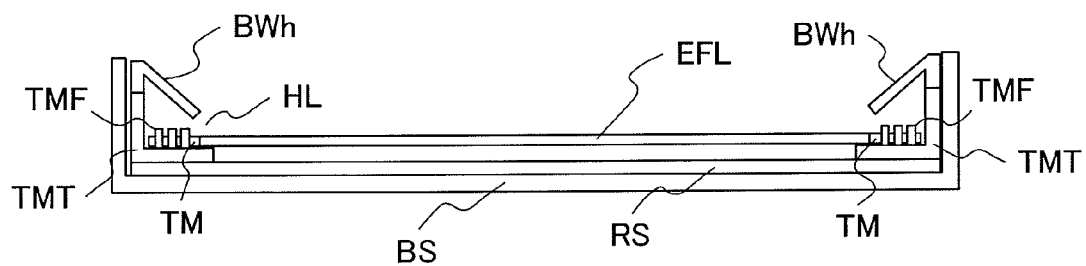

FIG. 4A is a plan view showing only the back light BL, and FIG. 4B is a cross-sectional view taken along the b-b line of FIG. 4A.

The side wall plates BWh are attached to the bottom frame BS through electrode support bases TMT (to be mentioned later) made, for example, of a resin material. Further, each of the side wall plates BWh is provided with holes HL on the edge on the bottom-frame-BS side such that electrodes TM formed at each end of the external electrode fluorescence tube EFL arranged through the hole HL are positioned on the back surface side of the side wall plates BWh.

Each electrode TM of the external electrode fluorescence tube EFL is sandwiched by (engaged to) electrode fittings TMF arranged on each of the electrode support bases TMT. Thereby, each external electrode fluorescence tube EFL is supported by the bottom frame BS through the electrode fittings TMF, and power is supplied through these electrode fittings TMF.

Figure 5:
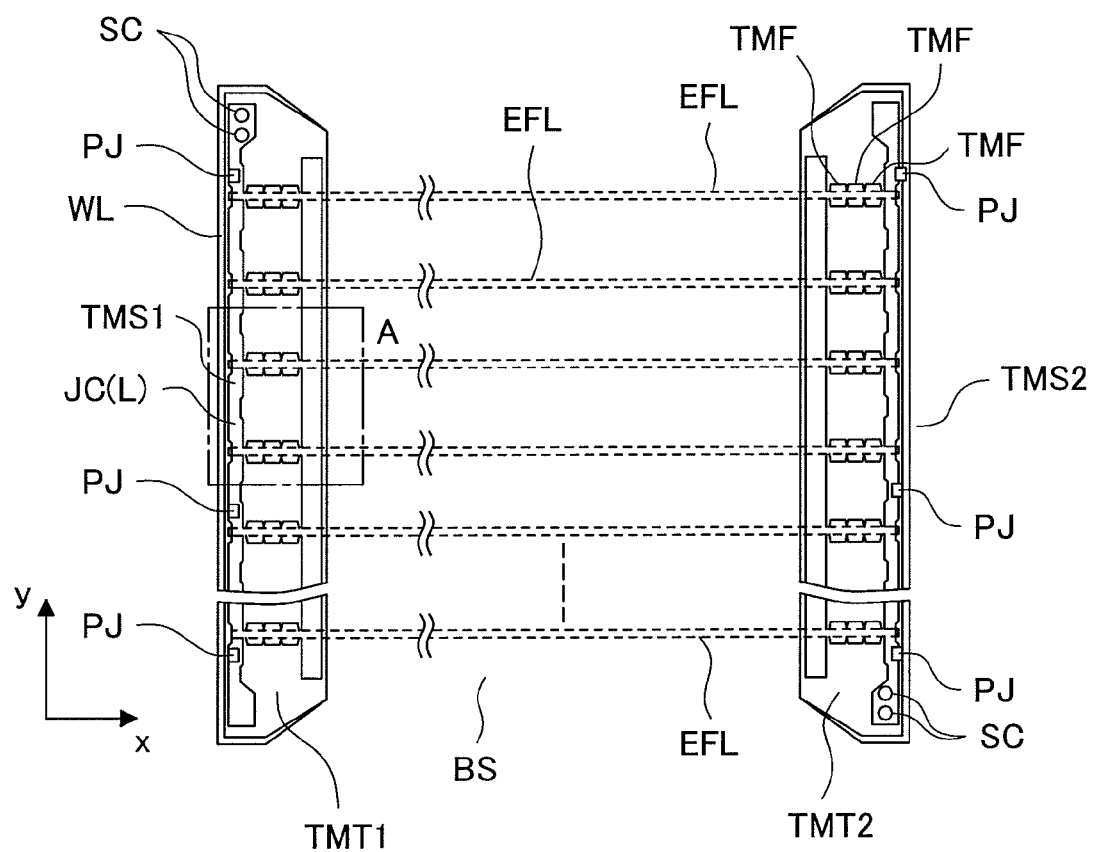
FIG. 5 is a plan view showing an embodiment of an electrode support member arranged in the back light.

The electrode fittings TMF are integrally formed with electrode support members TMS1 and TMS2 made of the same metal arranged on both end sides of each external electrode fluorescence tube EFL. FIG. 5 is a plan view showing the electrode support members TMS1 and TMS2 which are arranged on their respective electrode support bases TMT (shown as TMT1 and TMT2).

Referring to FIG. 5, one electrode support member TMS1 is arranged on the left-hand side of areas where the external electrode fluorescence tubes EFL (shown by dotted lines) are arranged, and the other electrode support member TMS2 is arranged on the right-hand side of the areas, each TMS being extended in the y direction. Specifically, the electrode support member TMS1 commonly supports the electrode TM sections at the left end of each external electrode fluorescence tube EFL, and the electrode support member TMS2 commonly supports the electrode TM sections at the right end of each external electrode fluorescence tube EFL.

Further, with the electrode support member TMS1, for example, three electrode fittings TMF arranged along the longitudinal direction of each electrode TM on the left-hand side of each external electrode fluorescence tube EFL sandwich the electrodes TM, thereby supporting each of the external electrode fluorescence tubes EFL. Likewise, with the electrode support member TMS2, for example, three electrode fittings TMF arranged along the longitudinal direction of each electrode TM on the right-hand side of each external electrode fluorescence tube EFL sandwich the electrodes TM, thereby supporting each of the external electrode fluorescence tubes EFL. Even if at least one electrical contact of the electrode fittings TMF is not sufficient, this configuration ensures electrical contacts by the remaining electrode fittings TMF.

Thus, the electrode support members TMS1 and TMS2 are configured such that, between a pair of junctions JC extending opposite to each other, groups of electrode fittings are supported with them being arranged in parallel in the extending direction of the junctions JC, each group of electrode fittings being composed of a plurality of electrode fittings TMF arranged side by side in a direction perpendicularly intersecting with the junctions JC.

These electrode support members TMS1 and TMS2 are formed, for example, by press working of a plate material.

FIG. 6A is an enlarged view of the portion surrounded by a dotted-line frame A of FIG. 5. Referring to FIG. 6A, the electrode support member TMS1 includes a base portion BP commonly fixing three electrode fittings TMF arranged side by side; and a left-hand side junction JC(L) and a right-hand side junction JC(R) which are commonly connected with base portions BP on each end side thereof. These base portions BP and the junctions JC(L) and JC(R) form a ladder pattern when observed in a 2-dimensional manner.

FIG. 6B is a cross-sectional view taken along the b-b line of FIG. 6A illustrating the electrode fitting TMF.

The electrode fitting TMF has a bifurcated structure having a pair of tongue pieces opposed to each other which sandwich an external electrode fluorescence tube EFL from both sides. Specifically, the electrode fitting TMF is provided with a pair of support portions SP formed, for example, by perpendicularly bending the sides of the base portion BP of the electrode support member TMS1, each of the support portions SP being provided with an arc portion which presses the external electrode fluorescence tube EFL from opposing sides of the circumferential surface. Further, the electrode fitting TMF is provided with introductory portions IN that help introduce the external electrode fluorescence tube EFL into the electrode fitting TMF. A dotted circle shown in FIG. 6B denotes the circumferential surface of an external electrode fluorescence tube EFL.

Figure 7A:
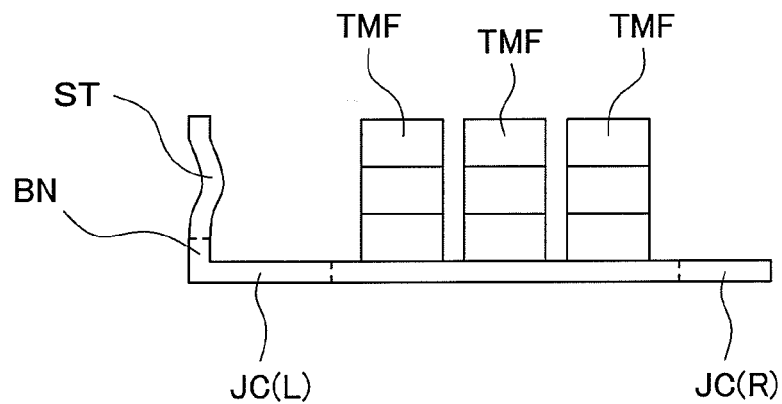
FIGS. 7A and 7B are cross-sectional views respectively taken along the VII(a)-VII(a) and VII(b)-VII(b) lines of FIG. 6.
Figure 7B:

The left-hand side junction JC(L) of the electrode support member TMS1 is provided with a bent edge BN which is perpendicularly bent, for example, at an edge on the left-hand side of the junction JC(L), as shown in FIG. 7B which is a cross-sectional view taken along the VII(b)-VII(b) line of FIG. 6A. The electrode support member TMS1 is formed such that it is extended comparatively long in a direction in which groups of electrode fittings are arranged in parallel (the y direction of FIG. 6A), causing bending to be easily produced. Therefore, the bent edge BN is provided to decrease the degree of bending. Further, as shown in FIG. 7A which is a cross-sectional view taken along the VII(a)-VII(a) line of FIG. 6A, protruding portions ST are implanted at portions where the bent edge BN intersects the extending direction of the base portions BP (the x direction of FIG. 6A). The protruding portions ST restrain the external electrode fluorescence tubes EFL from axially moving, the electrodes TM thereof being sandwiched by the electrode fittings TMF.

The same configuration having a reverse left-and-right relation also applies to the electrode support member TMS2 which is a counterpart of the electrode support member TMS1.

The thus-configured electrode support member TMS1 is mounted on the electrode support base TMT1 and fixed to the electrode support base TMT1 by use of screws SC on one end side of the electrode support member TMS1, as shown in FIG. 5.

The reason the electrode support member TMS1 is fixed only at one end is as follows: if fixed at both ends, when the electrode support member TMS1 thermally expands by the heat from the external electrode fluorescence tubes EFL, bending of the electrode support member TMS1 detached from the surface of the electrode support base TMT1 occurs between the fixing points. The electrode support member TMS1 is thus fixed on one end side in order to prevent this bending. That is, the electrode support member TMS1 is fixed only on one end side thereof to allow the elongation by the thermal expansion to be made toward the other end.

The electrode support member TMS1 fixed to the electrode support base TMT1 in this manner at only one end thereof is covered (hooked) by a plurality of projecting portions PJ formed intermittently along the longitudinal direction of the electrode support base TMT1 on the side wall surface WL on the side of the left-hand side junction JC(L) of the electrode support base TMT1. These projecting portions PJ prevent the electrode support member TMS1 from being detached from the electrode support base TMT1.

Figure 8:
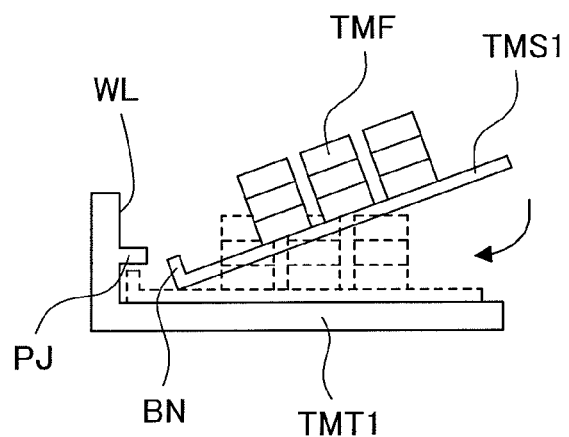
FIG. 8 is a diagram explaining a process of arranging the electrode support member onto an electrode support base.

FIG. 8 is a diagram showing a process for arranging the electrode support member TMS1 on the electrode support base TMT1. From the left-hand-side junction-JC(L) side, the electrode support member TMS1 is inserted under the projecting portion PJ on the side wall surface WL of the electrode support base TMT1. Then, the right-hand side junction JC(R) is mounted on the surface of the electrode support base TMT1 to complete the process. In this case, since the bent edge BN is formed on the support member TMS1 in the longitudinal direction thereof, it is possible to increase the rigidity of the support member. Further, the bent edge BN is effective for reducing a risk that bending occurs when and after the electrode support member TMS1 is arranged on the electrode support base TMT1.

Figure 9A:
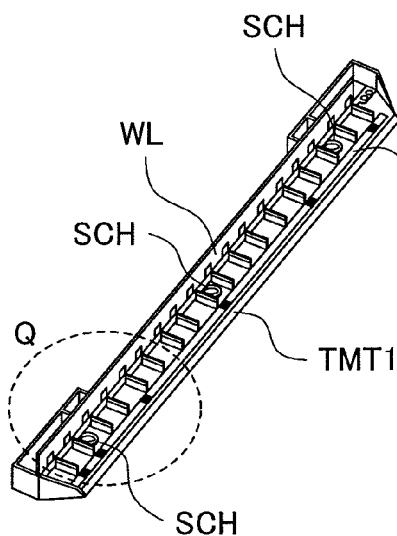
FIGS. 9A and 9B are perspective views of the electrode support base and a side wall surface fixed to the electrode support base.

FIG. 9A is a perspective view of the electrode support base TMT1 on which the electrode support member TMS1 is mounted, showing that the electrode support base TMT1 is provided with the side wall surface WL perpendicularly to the arrangement surface of the electrode support member TMS1 on the side of the left-hand side junction JC(L) (on the side opposite to the arrangement side of the external electrode fluorescence tubes EFL) of the electrode support member TMS1.

Figure 1:
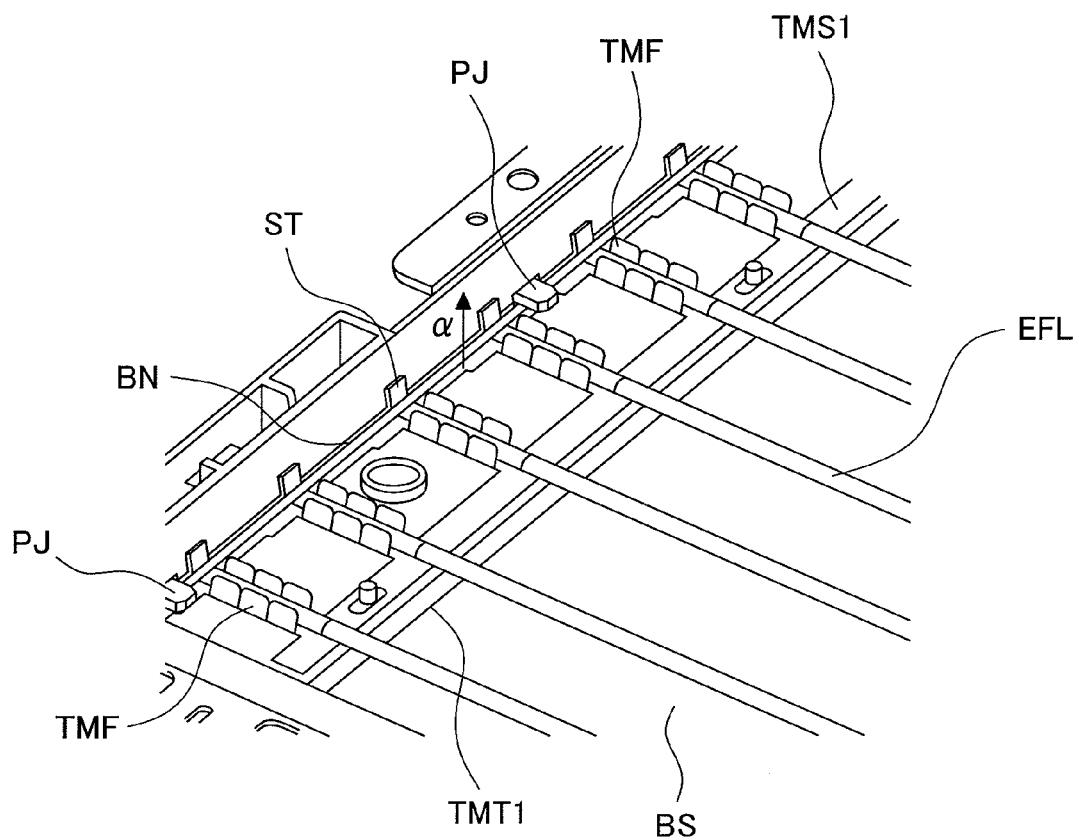
FIG. 1 is a perspective view of essential parts of an embodiment of a liquid crystal display device according to the present invention.

As shown in FIG. 1 which is an enlarged view of a dotted round frame Q of FIG. 9A, the side wall surface WL is provided with the projecting portions PJ which are formed so as to cover the top surface of the left-hand side junction JC(L) of the electrode support member TMS1. If, for example, the electrode support member TMS1 is detached from the surface of the electrode support base TMT1 in the direction shown by α in FIG. 1, the projecting portions PJ prevent the detachment.

The same configuration having a reverse left-and-right relation also applies to the electrode support base TMT2 that is a counterpart of the electrode support base TMT1.

Figure 9B:
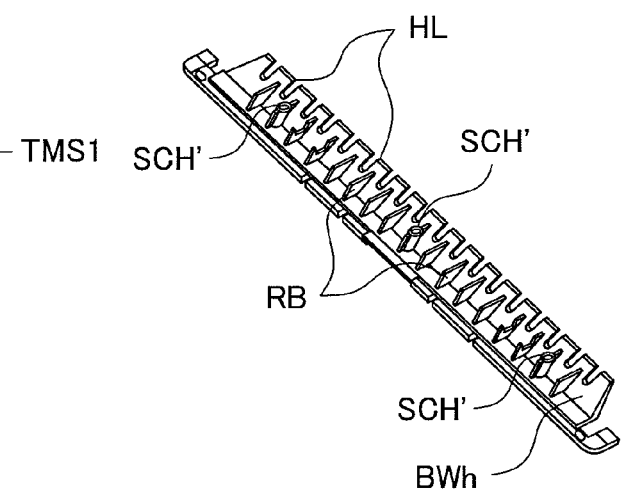

FIG. 9B is a perspective view of the side wall plate BWh, showing a state thereof when viewed from the back side of the surface having the function to reflect the light from the external electrode fluorescence tubes EFL. On the back side of the side wall plate BWh, a plurality of ribs RB are integrally formed in an intermittent manner between the arrangement portions of the external electrode fluorescence tubes EFL along the longitudinal direction of the side wall plate BWh, thereby reinforcing the side wall plate BWh against deformation. From the state shown in FIG. 9B, the side wall plate BWh is reversed, laterally inverted, and then placed on the electrode support base TMT shown in FIG. 9A so as to be temporarily fixed to the electrode support base TMT1.

Further, the electrode support base TMT1 is provided with screw holes SCH formed side by side in its longitudinal direction, and the side wall plate BWh is also provided with screw holes SCH' corresponding to the respective screw holes SCH. The central axes of the screw holes SCH and SCH' are in agreement when the side wall plate BWh is temporarily fixed to the electrode support base TMT1. The electrode support base TMT1 and the side wall plate BWh temporarily fixed in this manner are then fixed to the bottom frame BS with screws (not shown) screwed into the bottom frame BS through the screw holes SCH and SCH'.

With the above-mentioned embodiment, the projecting portions PJ for preventing the electrode support member TMS from being detached from the electrode support base TMT are provided such that a part of the left-hand side junction JC(L) is covered by them when the electrode support member TMS is, for example, the electrode support member TMS1 on the left-hand side. However, as shown in FIG. 10 drawn correspondingly to FIG. 5, it is also possible, of course, to provide the projecting portions PJ such that a part of the right-hand side junction JC(R) is covered by them.

Figure 10:
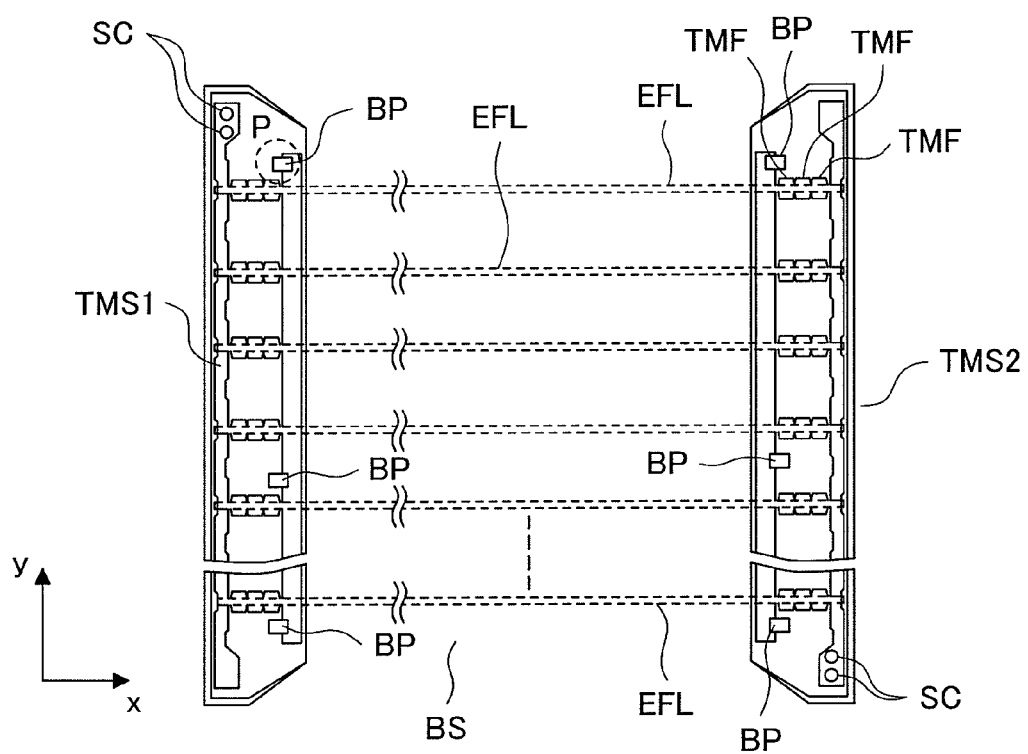
FIG. 10 is a plan view showing another embodiment of the back light of the liquid crystal display device according to the present invention.
Figure 11:
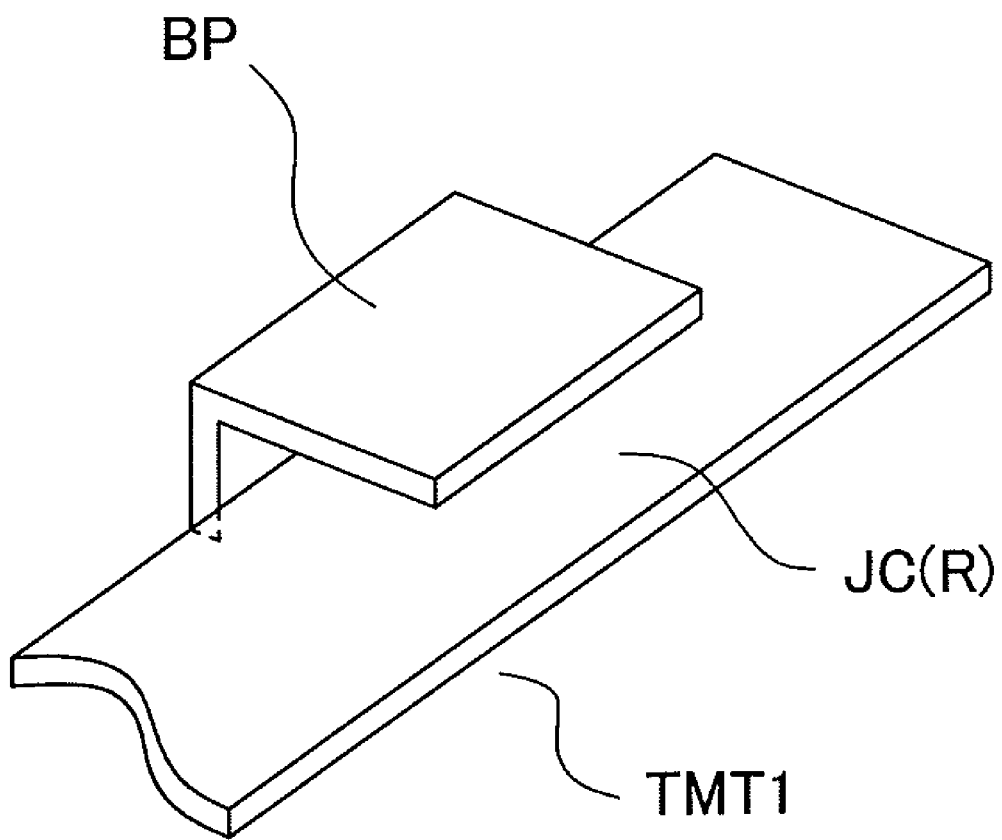
FIG. 11 is an enlarged perspective view of a portion surrounded by a dotted frame P of FIG. 10.

In this case, although the projecting portions PJ shown in FIG. 5 are formed on the side wall surface WL, the projecting portions shown in FIG. 10 are provided as bent projecting portions BP, as shown in FIG. 11 which is an enlarged perspective view of a dotted round frame P of FIG. 10. Since a side wall surface does not exist in the vicinity of the right-hand side junction JC(R), the projecting portions BP are fixed to the surface of the electrode support base TMT1.

Further, as another embodiment, it is also possible, of course, to provide an electrode support base TMT in a state where the projecting portions PJ shown in FIG. 5 and the projecting portions BP shown in FIG. 10 are provided together so as to prevent the electrode support member TMS from being detached from the electrode support base TMT.

The electrode support member TMS is fixed to the electrode support base TMT on one end side thereof. In this case, it is also possible, of course, to provide a plurality of fixing points, not limited to one, because it is presumed that thermal expansion has little adverse effect on the electrode support member TMS when these fixing points are provided in vicinity of each other. In brief, it is preferable to reliably arrange the electrode support member TMS on the bottom-frame-BS side without concern for thermal expansion by fixing the electrode support member TMS to the bottom-frame-BS side and providing the projecting portions PJ and BP fixed to the bottom-frame-BS side such that the electrode support member is covered by them.

Further, with the above-mentioned embodiment, although the electrode support member TMS is fixed to the bottom frame BS through the electrode support base TMT, it is also possible, of course, to directly fix it to the bottom frame BS without using the electrode support base TMT.

Further, with the above-mentioned embodiment, external electrode fluorescence tubes EFL are used as light sources of the back light BL. However, it is not limited thereto, but it is also possible, of course, to use bar light sources having a similar shape.

Each of the above embodiments can be used independently or in combination because the effects of each embodiment can be obtained in an independent or synergetic manner.

What is claimed is:

1. A liquid crystal display device comprising:
    a liquid crystal display panel; and
    a back light arranged on the back surface of the present liquid crystal display panel;
    wherein the back light is composed of a plurality of bar light sources arranged in parallel in a plane opposing the liquid crystal display panel, each of the plurality of bar light sources having an electrode portion at first and second ends thereof, a plurality of fitting portions supporting each electrode portion provided at the first and second ends of the bar light sources, first and second electrode support members being connected respectively to the plurality of fitting portions at the first and second ends of the bar light sources, the first and second electrode support members extending in a direction transverse to an extending direction of each bar light source so as to support a respective end of the plurality of bar light sources which are arranged in parallel, and a first and a second base respectively supporting the respective first and second electrode support member;
    wherein the respective first and second electrode support member is fixed to the respective first and second base at one region of the first and second electrode support member, and at least one projecting portion is fixed to the respective first and second base covers at at least another region of the first and second electrode support member along the extending direction of the first and second electrode support member; and wherein the at least one projecting portion is formed on a surface of the respective first and second base and includes a bent portion so as to form a portion which projects over and covers the at least another region of the respective first and second electrode support member; wherein the first and second electrode support member is fixed to the first and second base at the one region so as to suppress bending of the first and second electrode support member in response to heat from the plurality of bar light sources and to enable elongation of the first and second electrode support member in a direction away from the one region in response to the heat, and the at least one projecting portion suppresses detachment of the first and second electrode support member from the first and second base, respectively.

2. The liquid crystal display device according to claim 1, wherein:

the respective first and second electrode support member is fixed to the respective first and second base at the one region on only one end side of the first and second electrode support member in the extending direction thereof.

3. The liquid crystal display device according to claim 1, wherein:

the respective first and second electrode support member is intermittently provided with a plurality of another portions covered by a plurality of projecting portions along the extending direction of the first and second electrode support member.

4. The liquid crystal display device according to claim 1, wherein:

the projecting portion projects from a side wall surface of the respective first and second base to cover the at least another portion of the respective first and second electrode support member, the side wall surface being formed almost perpendicularly to a bottom surface of the first and second base.

5. The liquid crystal display device according to claim 1, wherein:

the projecting portion is formed on a mounting surface of the respective first and second base.

6. The liquid crystal display device according to claim 1, wherein the projecting portion which is fixed to the first and second base is fixed to a side of the first and second base.

7. The liquid crystal display device according to claim 1, wherein the first and second electrode support member is provided with a bent edge formed by bending along the extending direction thereof at least one edge thereof out of the edges which are in parallel with the extending direction thereof.

8. The liquid crystal display device according to claim 7, wherein the at least another portion of the first and second electrode support member which is covered by the projecting portion includes a portion at which the bent edge is formed.

9. The liquid crystal display device according to claim 7, wherein the first and second electrode support member is intermittently provided with a plurality of the another portions and which is covered by the projecting portion along the extending direction of the first and second electrode support member.

10. The liquid crystal display device according to claim 7, wherein the projection portion forms a portion which projects from a side wall surface of the first and second base to cover the at least another portion of the first and second electrode support member, the side wall surface being formed substantially perpendicularly, to a bottom surface of the first and second base.

11. The liquid crystal display device according to claim 7, wherein the projecting portion is formed on a mounting surface of the first and second base to provide a portion having a bent section so as to cover the at least another portion of the first and second electrode support member.

12. A liquid crystal display device comprising:

a liquid crystal display panel; and a back light arranged on the back surface of the present liquid crystal display panel;

wherein the back light is composed of a plurality of bar light sources arranged in parallel in a plane opposing the liquid crystal display panel, each of the plurality of bar light sources having an electrode portion at first and second ends thereof, a plurality of fitting portions supporting each electrode portion provided at the first and second ends of the bar light sources, first and second electrode support members being connected respectively to the plurality of fitting portions at the first and second ends of the bar light sources, the first and second electrode support members extending in a direction transverse to an extending direction of each bar light source so as to support a respective end of the plurality of bar light sources which are arranged in parallel, and a first and a second base respectively supporting the respective first and second electrode support member;

wherein the electrode fitting sandwiches a mating electrode section of each bar light source from both sides, the electrode fitting being provided on an electrode support member extending in a direction in which the bar light sources are arranged in parallel; and wherein the respective first and second electrode support member includes one portion fixed to the respective first and second base at one region on one end side of the first and second electrode support member and at least another portion of the first and second electrode support member covered by a projecting portion which is fixed to the first and second base at at least another region of the first and second electrode support member along the extending direction of the first and second electrode support member; wherein the first and second electrode support member is fixed to the first and second base at the one region so as to suppress bending of the first and second electrode support member in response to heat from the plurality of bar light sources and to enable elongation of the first and second electrode support member in a direction away from the one region in response to the heat, and the at least one projecting portion suppresses detachment of the first and second electrode support member from the first and second base, respectively.

13. The liquid crystal display device according to claim 12, wherein:

the first and second electrode support member is fixed to the first and second base at the one region on only the one end side in the extending direction of the first and second electrode support member, and the one fixing region exists at a position on a more external side of the first and second electrode support member than positions of the plurality of bar light sources with respect to the first and second electrode support member.

14. The liquid crystal display device according to claim 12, wherein:

the first and second electrode support member is provided with a plurality of another portions fixed to the first and second base in the extending direction of the first and second electrode support member, at least one of the plurality of another portions existing at least at another position on a more external side with respect to the first and second electrode support member than positions of the plurality of bar light sources with respect to the first and second electrode support member.

15. The liquid crystal display device according to claim 12, wherein the projecting portion which is fixed to the first and second base is fixed to a side of the first and second base.

16. A liquid crystal display device according to claim 12, wherein the first and second electrode support member is provided with a bent edge formed by bending along the extending direction thereof at least one edge thereof out of the edges which are in parallel with the extending direction thereof.

17. The liquid crystal display device according to claim 16, wherein the first and second electrode support member is fixed to the first and second base at the one region on only the one end side in the extending direction of the first and second electrode support member, and the one fixing region exists at a position on a more external side of the first and second electrode support member at the only one end side than positions of the plurality of bar light sources with respect to the first and second electrode support member.

18. The liquid crystal display device according to claim 12, wherein the first and second electrode support member is provided with a plurality of another portions fixed to the base in the extending direction of the first and second electrode support member, at least one of the plurality of another portions existing at least at another position on a more external side of the first and second electrode support member at the only one end side than positions of the plurality of bar light sources with respect to the first and second electrode support member.

* * * * *